United States Patent [19]
Yamamoto et al.

[11] Patent Number: 5,444,191
[45] Date of Patent: Aug. 22, 1995

[54] INFORMATION PROCESSING APPARATUS AND DEVICE FOR USE IN SAME

[75] Inventors: Keisuke Yamamoto, Yamato; Takehiko Kawasaki; Yoshio Suzuki, both of Atsugi; Haruki Kawada, Yokohama, all of Japan

[73] Assignee: Canon Kabushiki Kaisha, Tokyo, Japan

[21] Appl. No.: 40,277

[22] Filed: Mar. 30, 1993

[30] Foreign Application Priority Data

Apr. 1, 1992 [JP] Japan .................................. 4-105271
Mar. 12, 1993 [JP] Japan .................................. 5-77418

[51] Int. Cl.⁶ ........................ G08C 21/00; G11B 9/00; G11C 11/00; G11C 13/00
[52] U.S. Cl. ...................................... 178/18; 365/151; 369/126
[58] Field of Search ................. 178/18, 19; 345/177; 367/908; 364/114, 118, 179; 365/151; 369/126, 43

[56] References Cited

U.S. PATENT DOCUMENTS

| | | | |
|---|---|---|---|
| Re. 33,390 | 10/1990 | Shashida | 310/328 |
| 4,575,822 | 3/1986 | Quate | 365/174 |
| 5,126,618 | 11/1992 | Knowles | 178/18 |
| 5,132,934 | 7/1992 | Quate et al. | 365/151 |
| 5,253,187 | 10/1993 | Kaneko et al. | 178/18 X |
| 5,329,513 | 7/1994 | Nose et al. | 365/151 X |
| 5,345,137 | 9/1994 | Funakubo et al. | 310/323 |
| 5,371,727 | 12/1994 | Shido et al. | 365/151 X |

FOREIGN PATENT DOCUMENTS 60-83126 11/1985 Japan .................................. 345/177

OTHER PUBLICATIONS

E. E. Ehrichs, et al., "Etching of Silicon (111) with the Scanning Tunneling Microscope", Journal of Vacuum Science & Technology A, Second Series, vol. 8, No. 1, pp. 571–573 (Jan./Feb. 1990).

C. F. Quate, "Imaging with the Tunneling & Force Microscopes", IEEE Micro Electro Mechanical Systems, IEEE Catalog No. 90CH2832-4, pp. 188–191, (1990).

Primary Examiner—Stephen Chin
Assistant Examiner—Paul Loomis
Attorney, Agent, or Firm—Fitzpatrick, Cella, Harper & Scinto

[57] ABSTRACT

A compact information processing apparatus does not require any coarse mobile mechanism. In the information processing apparatus, a probe can be brought close to a medium to read information from the medium and to write it onto the medium. The information processing apparatus includes a device for applying a voltage between the probe 31 and the medium 31, and a device for generating a progressive wave in the in-plane direction of the medium to displace the medium.

10 Claims, 12 Drawing Sheets

(SECTION A-A)

FIG. 12A
PRIOR ART

X-DIRECTION

FIG. 12B
PRIOR ART

Y-DIRECTION

FIG. 12C
PRIOR ART

Z-DIRECTION

INFORMATION PROCESSING APPARATUS AND DEVICE FOR USE IN SAME

BACKGROUND OF THE INVENTION

FIELD OF THE INVENTION

The present invention relates to an information processing apparatus equipped with an actuator which can be driven by a piezo-electric member and above all, means which can slidingly move a medium by the utilization of the vibration of a piezo-electric member. Particularly, the present invention relates to an information processor equipped with means by which a probe and a medium are relatively moved in the in-plane direction on the basis of the principle of an ultrasonic motor. More particularly, the present invention relates to a device which can be used in such an information processor and which can displace a medium precisely.

RELATED BACKGROUND ART

In recent years, much attention has been paid to mechanical electric elements (micromechanics) such as a semiconductor pressure sensor, a semiconductor acceleration sensor and a microactuator in which each semiconductor is used in the form of a mechanical structure with a background of semiconductor process techniques.

Figure 10:
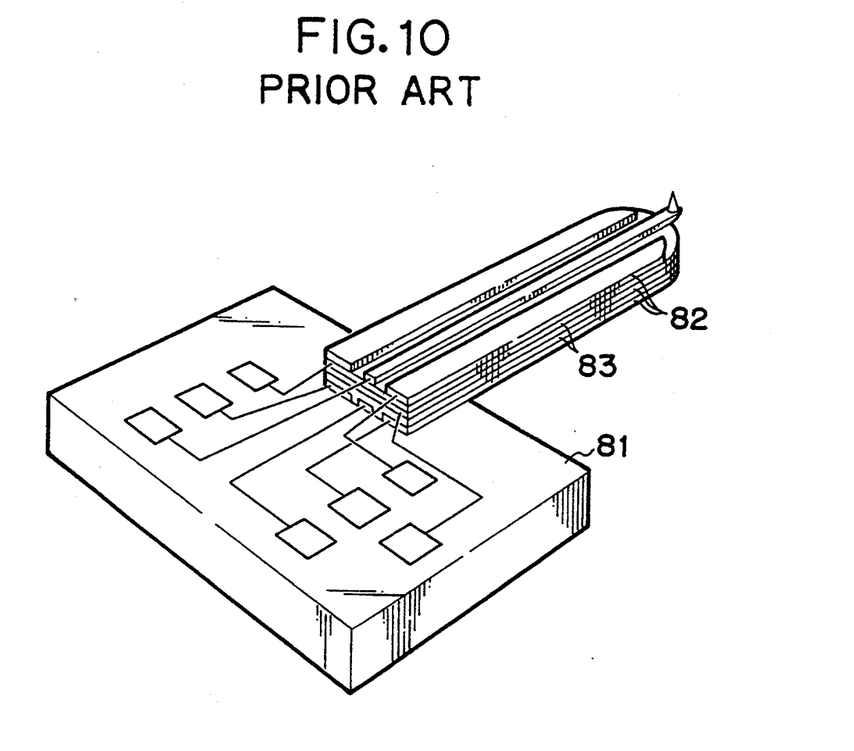
FIG. 10 shows an example of a cantilever type probe comprising a conventional piezo-electric bimorph.
Figure 11A:
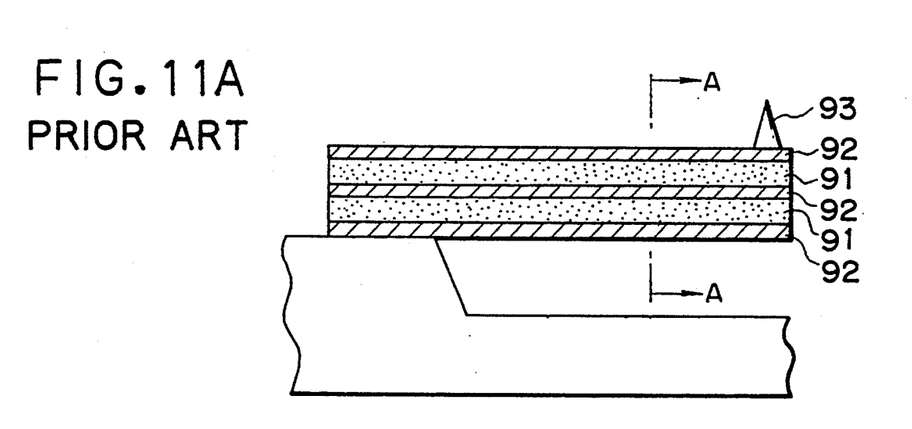
FIGS. 11A and 11B are sectional views of a cantilever type probe comprising a conventional piezo-electric bimorph.
Figure 11B:
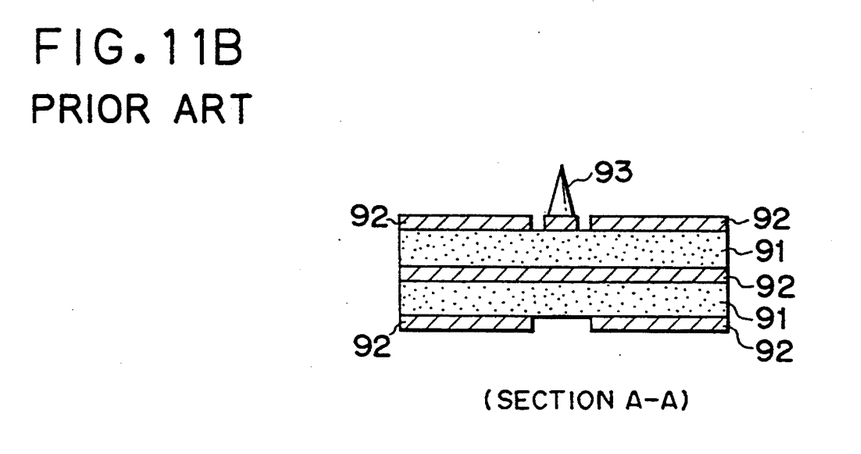
Figure 12A:
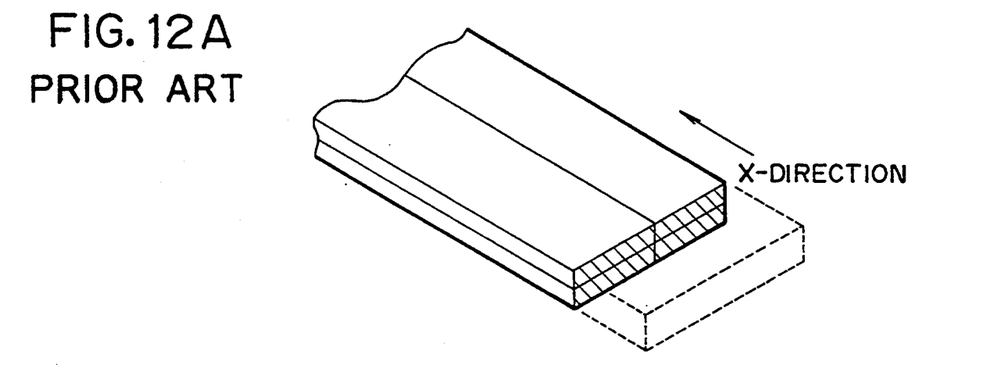
FIGS. 12A to 12C are schematic diagrams for the explanation of a driving procedure of a cantilever comprising the piezo-electric bimorph.
Figure 12B:
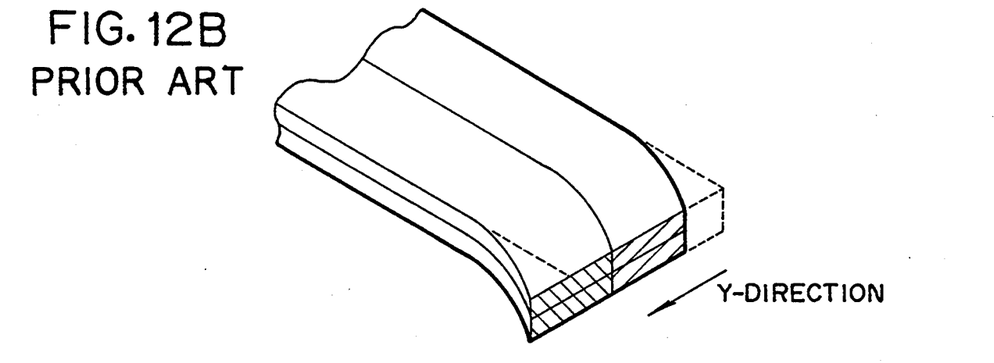
Figure 12C:
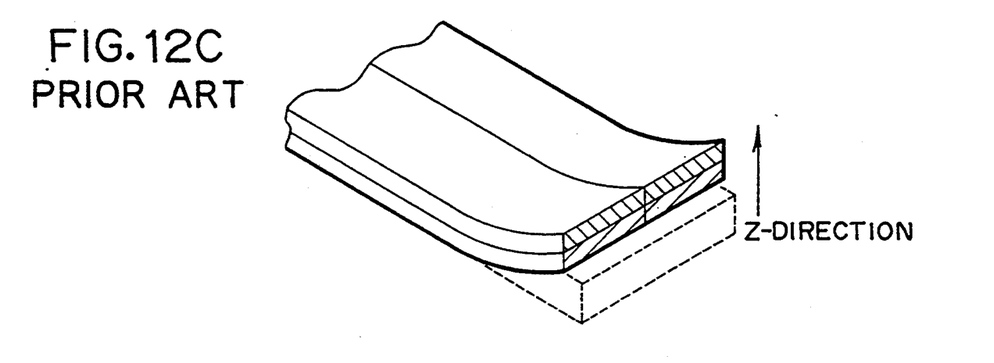

According to features of such an element, small-sized and highly precise mechanical structural parts can be provided, and the element can be integrated with an electric circuit on an Si wafer because it uses a semiconductor wafer. Furthermore, when a semiconductor process is used as a base, the improvement of the productivity by a batch treatment of the semiconductor process can be expected. In particular, as a micro-displacement element, a cantilever-like member utilizing a piezo-electric thin film can be used, and since this cantilever-like member can control a very fine movement, it has been applied to a scanning tunneling microscope (hereinafter referred to as "STM") which can directly observe an atomic or molecular level object. For example, there is an STM probe using a micro-displacement element which has been suggested by Quate et al. of Stanford University (IEEE Micro Electro Mechanical Systems, p. 188-199, Feb. 1990). This probe is constituted as shown in FIG. 10. In this drawing, the back surface of an Si wafer 81 is partially removed to form a silicon membrane, and Al thin films 82 and ZnO thin films 83 are laminated in turn on the surface to form a bimorph cantilever. Afterward, the silicon membrane and an etching protection layer (a silicon nitride film) on the wafer surface are removed from the back surface by reactive dry etching to form a bimorph cantilever for the displacement of an STM probe. On a free edge of the upper surface of this cantilever, a probe for the detection of a tunnel current is mounted, whereby a good STM image can be obtained. Furthermore, FIGS. 11A and 11B show another suggested cantilever type probe in which piezo-electric films 91 and electrodes 92 are laminated and the piezo-electric films are divided into 4 blocks and a probe 93 for the detection of the tunnel current is mounted on a free edge drivable in three axial directions. According to such a constitution, the cantilever can be driven separately in directions of X, Y and Z axes by applying a suitable bias between the electrodes, as shown in FIGS. 12A, 12B and 12C. For example, if the piezo-electric element is made from ZnO, if the micro-displacement element has a thickness of 5 $\mu$m, a length of 1,000 $\mu$m and a width of 200 $\mu$m, and if a voltage of 10 V is applied, displacement quantities of the cantilever are about 200 nm in the X axis direction, about 20 nm in the Y axis direction and about 750 nm in the Z axis direction. Thus, this cantilever can drive in three axial directions and can be easily integrated, and hence it can be estimated to be excellent. However, in order to carry out STM observation in a wide range, there is required a micro-driving operation by an XY stage on the side of a substance to be observed.

On the other hand, research has been conducted on applications of the STM technique to various fields such as the observation/evaluation of a semiconductor, a polymer material or the like in an atomic order or a molecular order, fine works (E. E. Ehrichs, 4th International Conference on Scanning Tunneling Microscopy/spectroscopy, 89, S13-3), and recording/reproducing devices. Among others, in the field of calculation/information of a computer, the demand for a recording device having a large capacity is more and more increased. The progress of the semiconductor process technique leads to the miniaturization of microprocessors and the improvement of calculation power, and thus it is desired to miniaturize the recording device. For the purpose of meeting these requirements, a recording/reproducing device has been suggested in which a voltage is applied from a converter comprising a tunnel current generation probe present on a driving means capable of finely adjusting a space between the probe and a recording medium, whereby a work function on the surface of the recording medium is changed to thereby carry out recording/writing, and on the other hand, information is read out by detecting a change of the tunnel current attributed to the change of the work function, and in this case, a minimum recording area is 10 nm$^2$.

Furthermore, another recording/reproducing device has been suggested, and in this device, an STM probe is formed on a free edge of each cantilever, and the independently displaceable cantilevers are multiplied. On one substrate which is integrated with a semiconductor process mechanism, there are mounted the cantilevers with probes for the detection of the tunnel current, an amplifier for amplifying the tunnel current, a multiplexer for the drive of the cantilever and the selection of the tunnel current, a left register and the like.

However, in a conventional device, many mobile mechanisms such as a large coarse mobile mechanism, a coarse mobile mechanism and a micro-mobile mechanism are required, which makes the device complex and large, and such a device is not preferable from a viewpoint of delivery. On the other hand, when the coarse movement of a displacement element capable of performing a constant physical displacement from an initial probe position to a tunnel current-detectable position during driving and a micro-mobile mechanism such as wobbling for following the displacement in an extremely narrow region are simultaneously carried out by one mobile mechanism, one of these mechanisms cannot be achieved sufficiently. Additionally, at the time of the coarse movement, an excessive load is applied to the element at times, and therefore these mechanisms are preferably separated. Further, when a power source is suddenly shut off by power failure, the probe is brought into contact with a recording medium, so that the recording medium is damaged sometimes.

SUMMARY OF THE INVENTION

An object of the present invention is to provide a miniaturized information processing apparatus which can bring a probe close to a recording medium with a good reproducibility and which does not require a scanning stage, and a device for use in this information processor.

Another object of the present invention is to provide an information processing apparatus to which a high-speed scanning tunnel microscope and its principle are applied.

The first aspect of the present invention which can achieve the above-mentioned objects is directed to an information processor in which a probe can be brought close to a medium to read information from the medium and to write it onto the medium, the information processing apparatus being characterized by having a means for applying a voltage between the probe and the medium, and a means for generating a progressive wave in the in-plane direction of the medium to displace the medium.

The second aspect of the present invention is directed to an information processing apparatus in which a probe can be brought close to a medium to read information from the medium and to write it onto the medium, the information processing apparatus being characterized by having a means for applying a voltage between the probe and the medium, and a means which has a piezo-electric film interposed between a plurality of divided electrodes and generates a progressive wave in the in-plane direction of the medium to displace the medium.

The third aspect of the present invention is directed to an information processing apparatus in which a probe can be brought close to a medium to read information from the medium and to write it onto the medium, the information processing apparatus being characterized in that the probe is provided on a free edge of a cantilever which is provided on a substrate, and a piezo-electric film and electrodes for displacing the piezo-electric film by an inverse piezo-electric effect are disposed on the substrate, whereby a progressive wave is generated in the in-plane direction of the medium to displace the medium.

The fourth aspect of the present invention is directed to a device for use in an information processing apparatus in which a probe can be brought close to a medium to read information from the medium or to write it onto the medium, the device being characterized in that the probe is provided on a free edge of a cantilever which is provided on a substrate, and a piezo-electric film and electrodes for displacing the piezo-electric film by an inverse piezo-electric effect are disposed on the substrate, whereby a progressive wave is generated in the in-plane direction of the medium to displace the medium.

DETAILED DESCRIPTION OF THE PREFERRED EMBODIMENTS

In a preferable embodiment of the present invention, a driving mechanism based on the principle of an ultrasonic motor is used as a means for relatively moving a probe and a recording medium in the in-plane direction of the medium. According to the driving mechanism of the present invention, the recording medium can be precisely moved in the in-plane direction, and in addition, the distance (Z) between the probe and the recording medium can be controlled.

Another preferable embodiment of the present invention is directed to a multi-probe head which comprises, on one substrate, at least one cantilever type probe having a probe for input and output of information on a free edge of the upper surface of a cantilever-like displacement element comprising at least one piezo-electric film and electrodes for displacing the piezo-electric film by an inverse piezo-electric effect, and at least one piezo-electric membrane comprising at least one piezo-electric film and electrodes for displacing the piezo-electric film by an inverse piezo-electric effect. This multi-probe head is characterized in that the piezo-electric membrane is a means for scanning a medium disposed so as to confront the multi-probe head in the in-plane direction of the medium by the vibration of the piezo-electric membrane. Preferably, the cantilever-like displacement element can be driven in three axial directions.

Still another embodiment of the present invention is directed to an information processor which can record, reproduce and erase information on a recording medium by the use of tunnel current, and this information processor is characterized by having the above-mentioned multi-probe head.

According to the multi-probe head of the present invention, ultrasonic vibration is brought about in the piezo-electric membrane, and the recording medium is forwarded in the in-plane direction by means of this vibration. Simultaneously, positioning in the vertical direction can be achieved by the piezo-electric cantilever.

Figure 3:
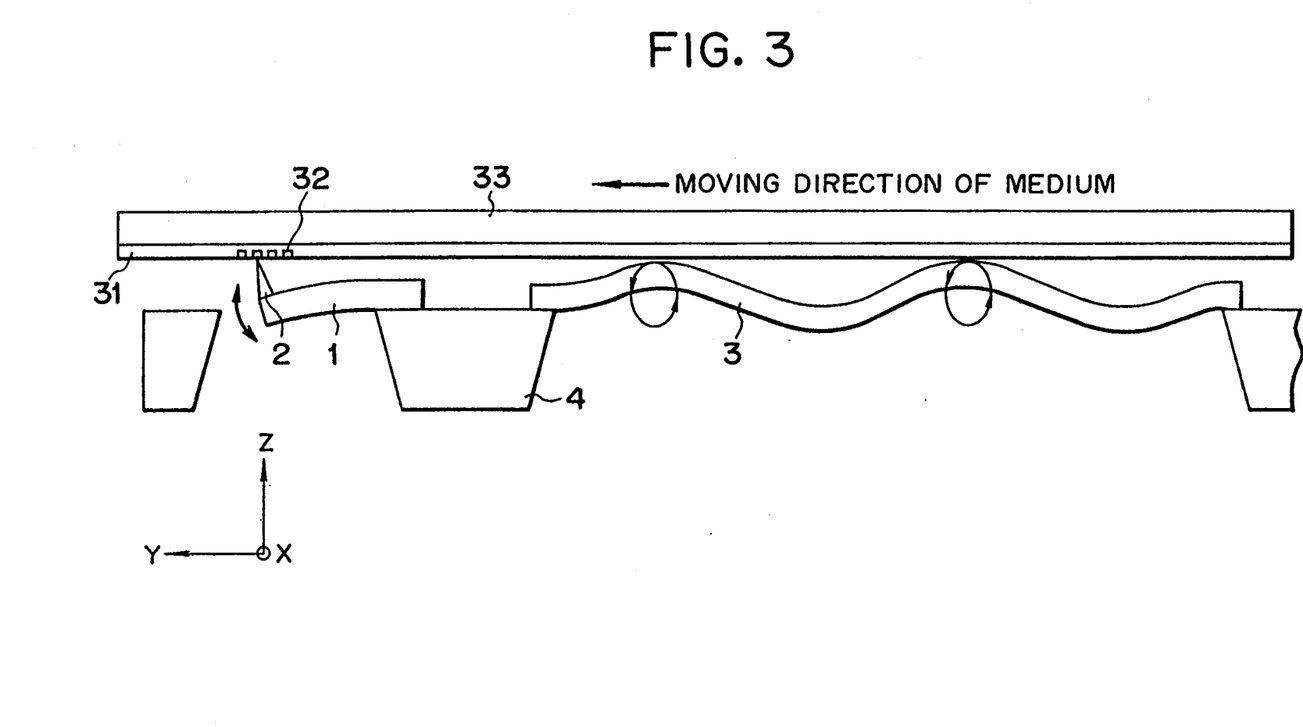
FIG. 3 is a schematic diagram illustrating the principle of the present invention.

FIG. 3 is a schematic diagram illustrating the principle of the present invention. The embodiment in this drawing comprises a piezo-electric cantilever 1 integrally formed on an Si substrate 4, a probe 2 for writing and reading of information, and a piezo-electric membrane 3 for sliding a recording medium 31. Here, when the piezo-electric membrane 3 is constituted suitably in the form of electrodes and AC voltages having different phases are applied to the electrodes, the surface of the piezo-electric membrane 3 moves in an elliptic form by a progressive wave produced by the combination of longitudinal and transversal waves, as shown in FIG. 3. As a result, the recording medium 31 slides in the direction shown in the drawing. The piezo-electric cantilever 1 can be actuated in the direction of Z, and the recording and reproducing of information can be carried out on the recording medium 31 by the probe 2. In this connection, reference numeral 32 is a recording bit, and numeral 33 is a substrate of the recording medium 31.

In order to simultaneously carry out the slide of the recording medium and the recording/writing and reproducing in accordance with the principles of STM, design must be made taking care of a characteristic frequency of the piezo-electric cantilever and that of the piezo-electric membrane. For example, the characteristic frequency $Fr_1$ of the piezo-electric cantilever can be represented by the following equation.

$$Fr_1 = 0.3563 \times \pi h/4l^2 \times (E/3\rho)^{\frac{1}{2}}$$

wherein h: film thickness of the piezo-electric cantilever l: length of the piezo-electric cantilever E: Young's modulus of the piezo-electric cantilever, and $\rho$: density of the piezo-electric cantilever.

Furthermore, the characteristic frequency $Fr_2$ of the piezo-electric membrane can be represented by the following equation.

$$Fr_2 = V/2L$$

wherein V: ultrasonic velocity in the piezo-electric membrane elastic material, and L: length of electrodes constituting the piezo-electric membrane.

The design of size, shape, material and the like should be made so that the characteristic frequency $Fr_1$ of the piezo-electric cantilever may be higher than the characteristic frequency $Fr_2$ of the piezo-electric membrane in accordance with the above-mentioned formulae.

Furthermore, if the piezo-electric cantilever is prepared so as to be drivable in three directions of the X, Y and Z axes, the recording medium can be stepwise slid by the piezo-electric membrane. Therefore, the characteristic frequency is not so influential.

In this case, a higher drive is possible.

Furthermore, there is also known an ultrasonic motor utilizing the principle of delivery on the basis of the generation of progressive wave by the vibration of the piezo-electric material. This ultrasonic motor can relatively move the probe and the recording medium under a good control.

Now, the present invention will be described in detail in reference to examples. The scope of the present invention should not be limited to these examples.

EXAMPLE 1

In this example, a multi-probe head (device) of the present invention will be described.

Figure 1:
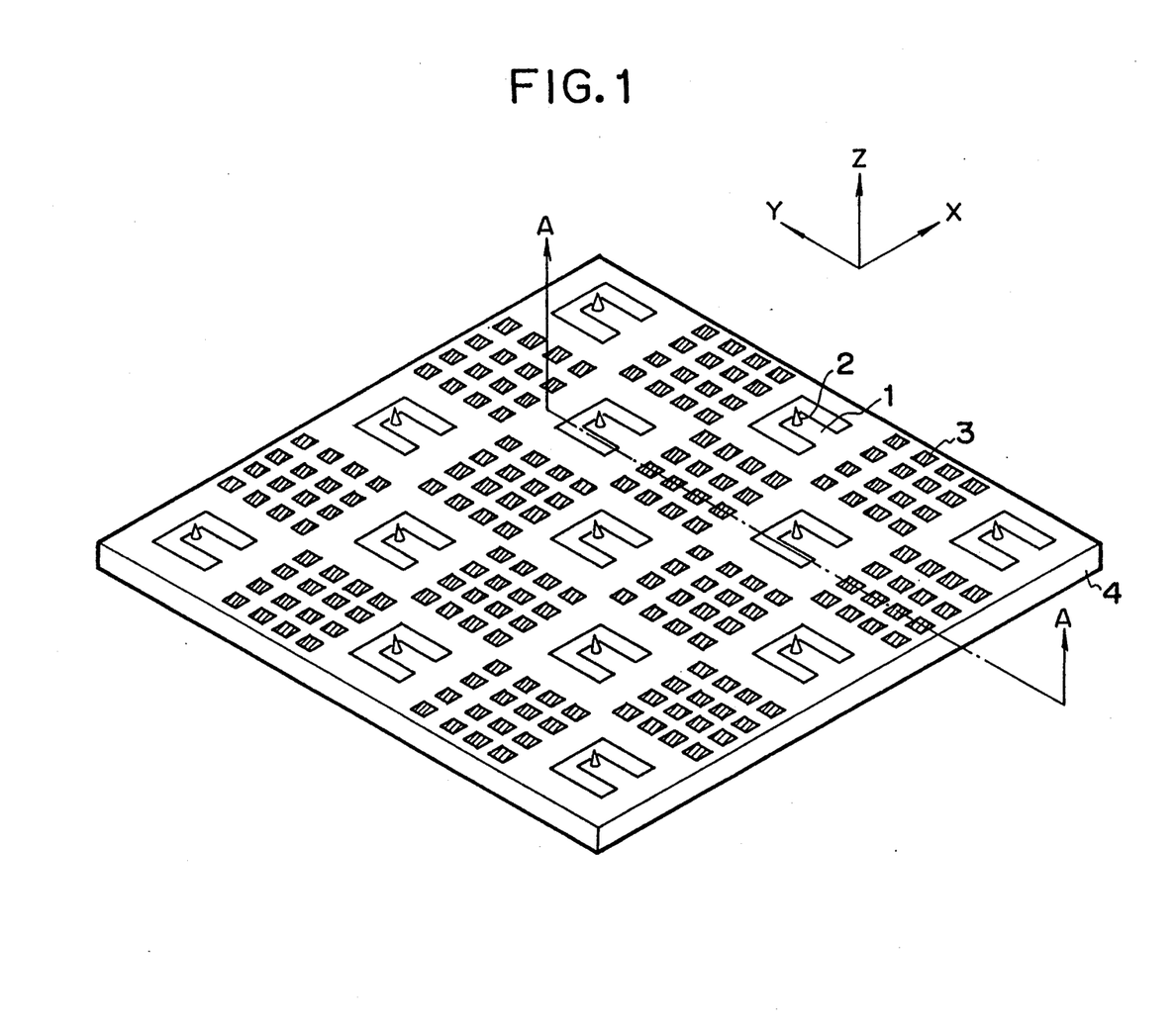
FIG. 1 is a perspective view of a multi-probe head of the present invention.
Figure 2:
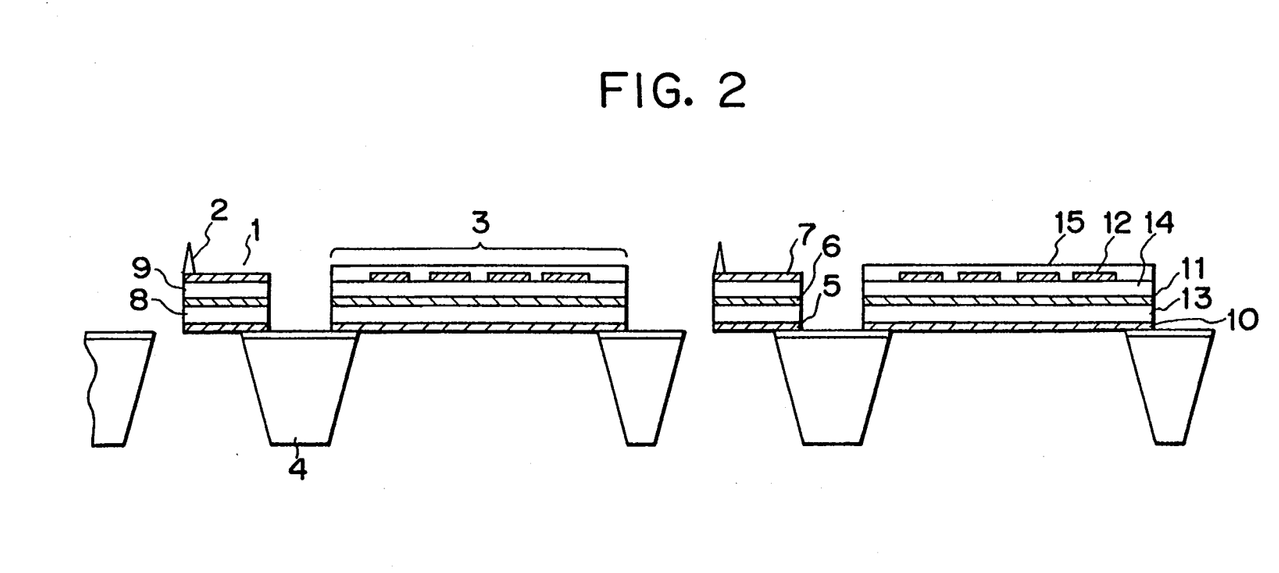
FIG. 2 is a sectional view of the multi-probe head of the present invention.

FIG. 1 shows a perspective view of a multi-probe head of the present invention. This head was formed on an Si substrate by utilizing a usual IC production process and an Si anisotropic etching technique. In the multi-probe head, piezo-electric cantilevers 1, probes 2 for input/output of information and piezo-electric membranes 3 are arranged in a matrix state on an Si substrate 4. Although not shown, ICs of a circuit for the operation of the multi-probe head, a circuit for signal processing and the like are mounted on the Si substrate 4, which will be described hereinafter. The piezo-electric membranes 3 can be operated to scan the recording medium along an X axis and a Y axis. FIG. 2 shows a schematic view cut along the line A—A in FIG. 1. Each piezo-electric cantilever 1 comprises a laminate of a lower electrode 5, a middle electrode 6 and an upper electrode 7 as well as piezo-electric films 8, 9, the above-mentioned electrodes being disposed to apply a voltage to the piezo-electric films 8, 9. According to this constitution, the piezo-electric cantilever 1 can be actuated as a bimorph piezo-electric element. The probe 2 is formed on a free edge of this piezo-electric cantilever 1. Next, each piezo-electric membrane 3 comprises a laminate of a lower electrode 10, a middle electrode 11, an upper electrode 12, piezo-electric films 13, 14 as well as an uppermost protective layer 15 made of an insulating material, the above-mentioned electrodes being disposed to apply a voltage to the piezo-electric films 13, 14. AC voltages having different phases are applied to many upper electrodes 12 two-dimensionally arranged and divided as shown in the drawing, whereby a progressive wave is brought about on the piezo-electric membranes 3. In this case, the lower piezo-electric films 13 function as elastic materials, and a unimorph movement is given by the upper piezo-electric films 14.

Figure 4A:
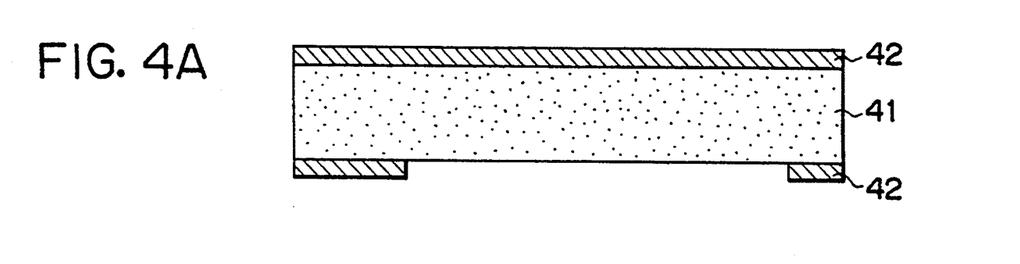
FIGS. 4A to 4D are schematic diagrams illustrating preparation steps of the multi-probe head of the present invention.
Figure 4B:
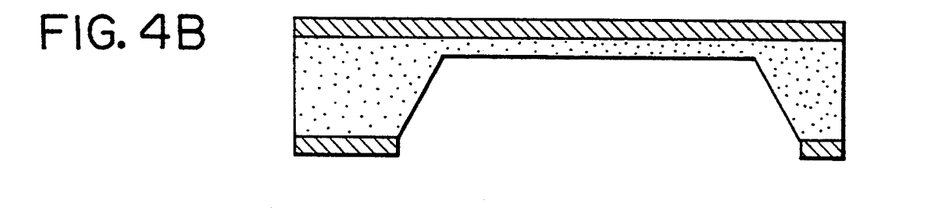
Figure 4C:
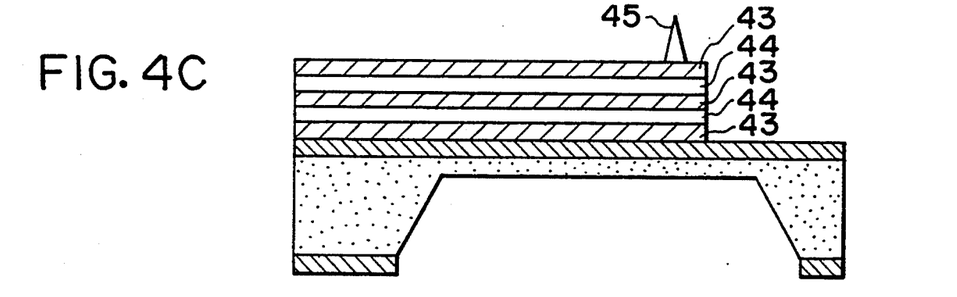
Figure 4D:
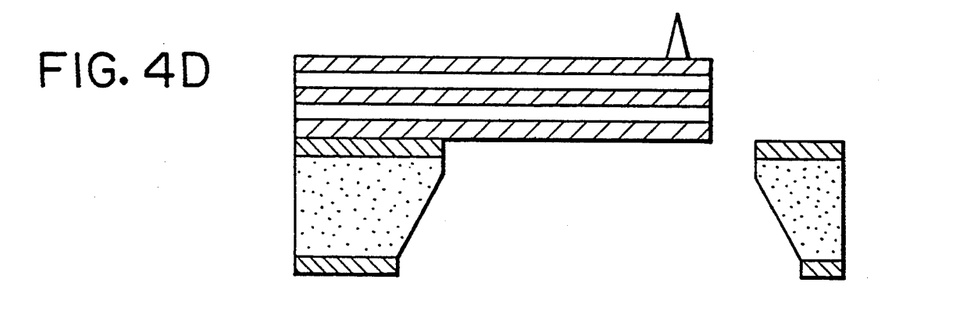

A preparation procedure of the above-mentioned piezo-electric cantilever will be described in reference to FIGS. 4A–4D, which show a preparation process of the piezo-electric cantilever. Si₃N₄ films 42 having a thickness of 1,000 Å are formed on both sides of a (100) Si substrate 41 by an LPCVD (low pressure chemical vapor deposition) device, and the back surface alone of the substrate is then patterned (FIG. 4A). Afterward, the anisotropic etching of Si in a cantilever region is carried out with an aqueous KOH solution by the use of the Si₃N₄ film 42 as a mask to form an Si membrane having a thickness of several tens μm (FIG. 4B). Next, an electrode layer 43 of Al or the like is formed on the surface of the Si₃N₄ film 42 and then patterned, and similarly a piezo-electric layer 44 of ZnO or the like is formed by sputtering and then patterned. This operation is repeated again. Finally, a probe 45 is formed by a lift-off method (FIG. 4C). Next, the surfaces of the probe 45 and the like are protected with polyimide or the like, and Si and the Si₃N₄ film 42 are then etched. In the last step, the polyimide is removed (FIG. 4D). This is the preparation process of the piezo-electric cantilever, but the piezo-electric membrane can also be formed simultaneously by all the same process.

Next, an IC circuit for the above-mentioned multi-probe head of the present invention will be described.

Figure 5:
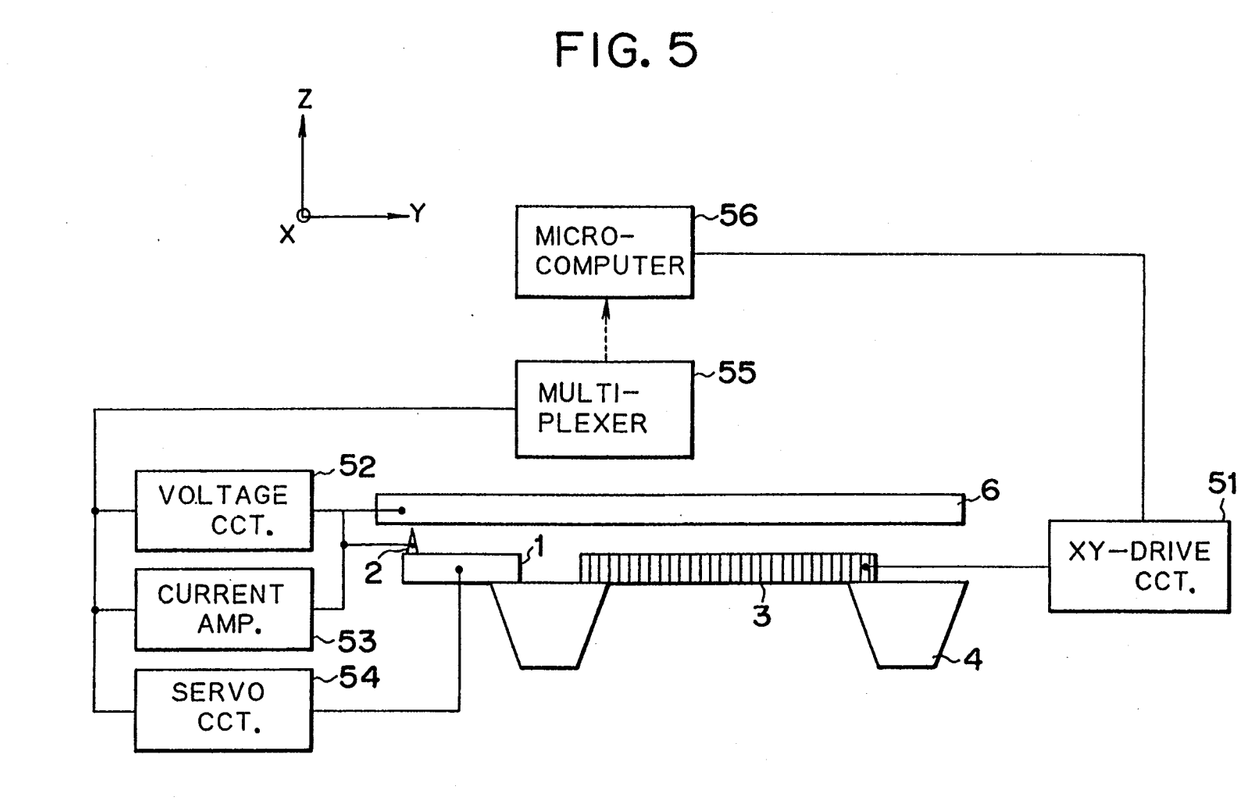
FIG. 5 is a block diagram illustrating the multi-probe head of the present invention.

FIG. 5 shows a block diagram of the multi-probe head of the present invention.

Figure 6:
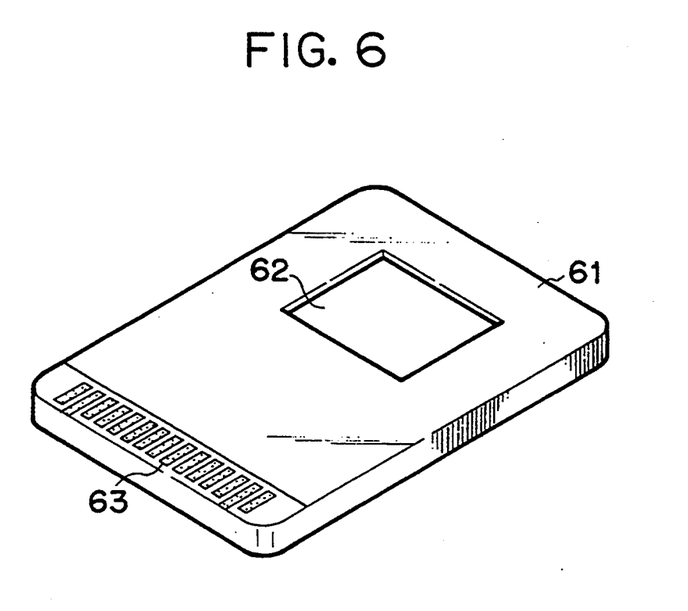
FIG. 6 is a perspective view of an information processor using the multi-probe head of the present invention.

Reference numeral 51 is an X-Y driving mechanism circuit for driving the recording medium 6 by the piezo-electric membrane 3. Numeral 52 is a voltage application circuit for applying a voltage between the probe 2 and the recording medium 6, and 53 is a current amplifier for amplifying a tunnel current between the probe 2 and the recording medium 6. Furthermore, reference numeral 54 is a servo circuit for regulating a voltage to be applied to the piezo-electric cantilever 1 so that a current detected by using the current amplifier 53 may be constant. Reference 55 is a multiplexer unit for controlling a plurality of cantilevers 1 in turn. These circuits are mounted as ICs on the Si substrate 4 of the multi-probe head and can be controlled by a micro computer 56. This multi-probe head and the medium are fixed in such a frame 61 as shown in FIG. 6 so that a mobile axis may not deviate. Numeral 62 is a window through which the recording medium 6 can be seen, and 63 is a wire extending to the multi-probe head. As shown, the recording medium can be integrated with the multi-probe head.

Next, reference will be made to the result of recording/reproducing by the use of this multi-probe head. There was used a recording medium which was obtained by vapor-depositing Cr/Au on a glass substrate, and then forming polyimide Langmuir-Blodgert (LB) film (thickness=about 15 Å) thereon. A voltage of 1 V was applied to the electrodes of the recording medium and a plurality of the probes, and an electric field was applied to the piezo-electric films of the piezo-electric cantilevers so that a tunnel current of about 1 nA might flow in all the probes, whereby positions of the probes were moved in the Z axis direction in FIG. 5.

This recording medium has a feature that a resistivity of the recording medium changes as much as about 2 orders by the application of a pulse voltage.

Afterward, a pulse voltage (5 V, 1 $\mu$sec) was applied to a plurality of probes and the recording medium was then scanned by the piezo-electric membrane, and information was recorded at desired positions. The region of each position to be recorded was very small, about 100 Å$\times$100 Å, so that the recording could be achieved at a high density.

Next, a voltage of 1 V was applied to between the probe and the recording medium, and the probe was then scanned similarly. A change of a tunnel current was observed, and as a result, the change of a resistivity was detected in the previously recorded region. Thus, in this example, it was confirmed that the information could be written or read.

The recorded information could be erased. That is, the probe was scanned on the recorded region of the recording medium, and a pulse voltage (4 V/$\mu$sec) more than a threshold value was applied between the probe and the electrode of the recording medium, so that characteristics of a recording bit changed and the resistivity in the region was equal to that at a portion having no recording bit, whereby the erasure of the recorded information could be achieved.

As the recording medium for the information record, a material which has a memory switching phenomenon (an electric memory effect) can be utilized, in addition to the above-mentioned material.

The electric memory effect means that when a voltage is applied, at least two different resistance states occur, and the respective states are freely shifted by applying a voltage or current more than a threshold value for changing the conductivity of the recording layer, and the obtained resistance states can be maintained even when a voltage or current not more than the threshold value is applied.

EXAMPLE 2

In this example, another embodiment of a multi-probe head of the present invention will be described. Example 2 is different from Example 1 in that a recording medium is rotatable.

Figure 7:
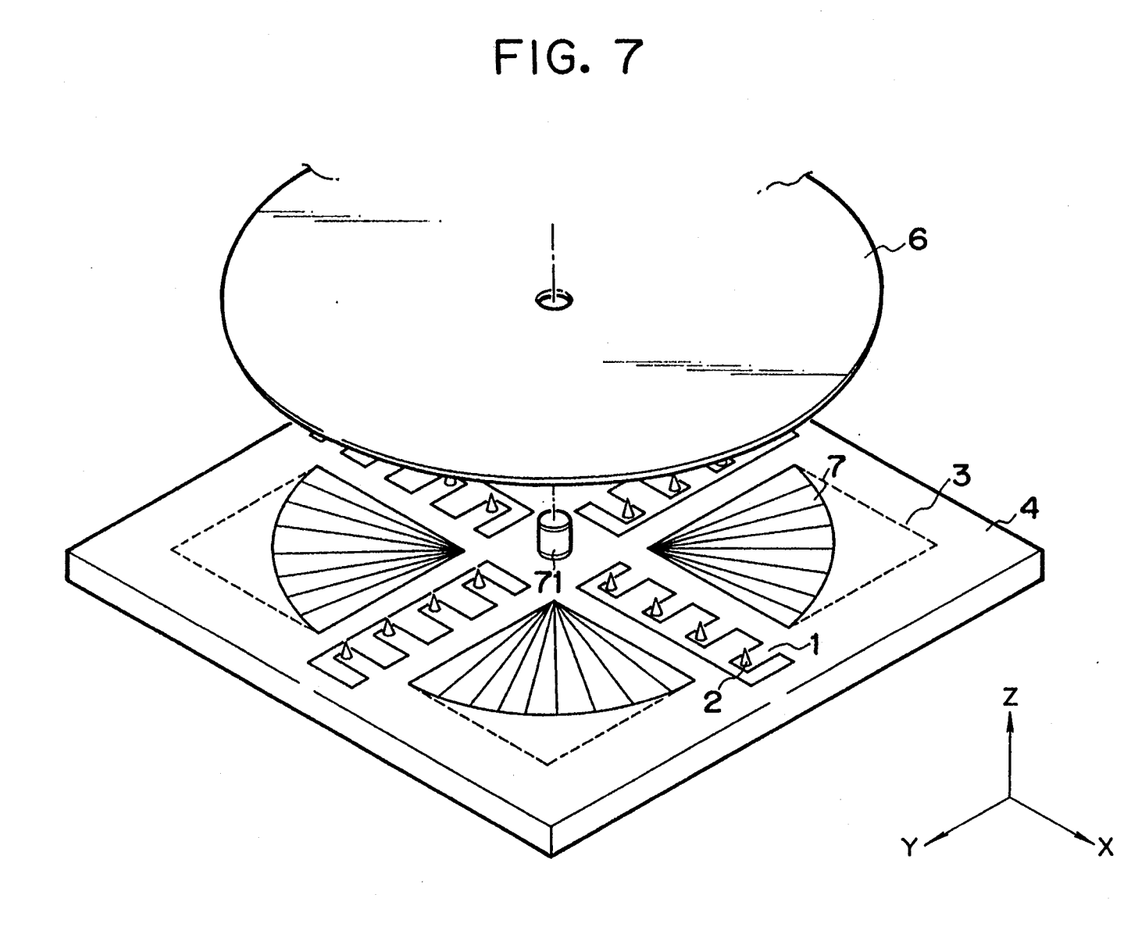
FIG. 7 is a perspective view illustrating another embodiment of the multi-probe head of the present invention.

FIG. 7 shows a perspective view of the multi-probe head of the present invention in this example. As in Example 1, piezo-electric cantilevers 1 and probes 2 are present on an Si substrate 4, and electrodes 7 are formed on each piezo-electric membrane 3. When a recording medium 6 is set around a central axis 71 and an AC voltage is applied to upper electrodes 7 on the piezo-electric membranes 3, the recording medium rotates. The radii of the piezo-electric cantilevers 1 are diverted little by little so that recording can be carried out in a wide range. When this multi-probe head was used, about the same results in Example 1 could be obtained.

EXAMPLE 3

In this example, a multi-probe head having an ultrasonic driving mechanism is replaced with an ultrasonic motor 201, and a recording medium is rotated to move a probe relatively to the recording medium in the in-plane direction of the recording medium.

In FIGS. 8 and 9A–9C, reference numeral 31 is a recording medium comprising $Si_3N_4/SiO_2$/p-Si as disclosed in U.S. Pat. No. 4,575,822. Recording can be achieved by using this recording medium and applying a voltage between the probe and the medium. Reproduction can be done by detecting a tunnel current which flows between the probe and the medium. Numeral 201 is the ultrasonic motor, which is composed of a rotor 202 and a rotor rotating/driving mechanism 203. This rotor rotating/driving mechanism is controlled by a control mechanism for rotating/driving 211, and it is composed of a base 304, a pair of 12-divided and patterned electrodes (not shown) formed on the base 304, a piezo-electric sheet 303 made of PZT or the like and interposed between the pair of electrodes, and a stator 301. Numeral 305 is a spring washer. Numerals 306 and 307 are an axle and a bearing, respectively.

Figure 8:
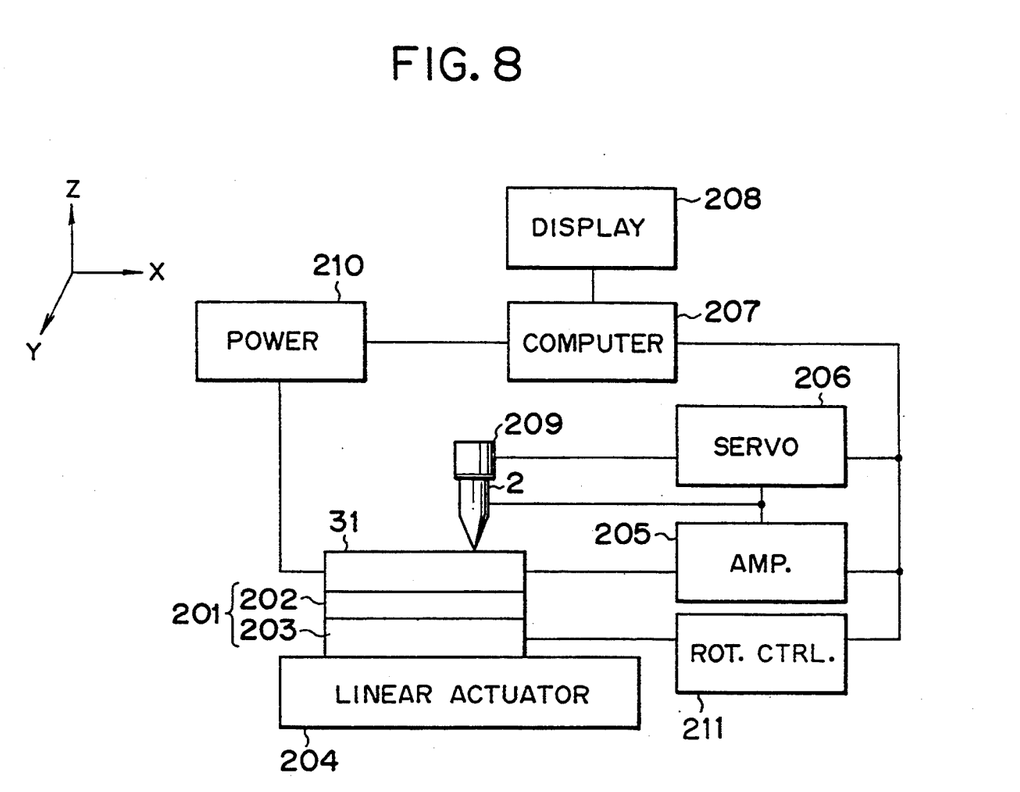
FIG. 8 is a block diagram illustrating an embodiment utilizing an ultrasonic motor of the present invention.

Numeral 204 is a linear actuator, which is a mechanism for driving one axis, the recording medium and the ultrasonic motor comprising the rotor and the rotor rotating/driving mechanism. Numeral 205 is a current amplifier, and 206 is a servo circuit for detecting a current obtained by the probe and controlling a micromobile mechanism 209 using a piezo-electric cantilever element so as to make a current value constant. Numeral 210 is a power source for applying a pulse and a bias voltage for recording and reproducing.

Since the current which flows in the probe rapidly changes at a time when a pulse voltage is applied, the servo circuit 206 controls an HOLD circuit to ON at that time so that an output voltage may be constant.

These functions are all controlled by a micro computer 207. Moreover, numeral 208 denotes a display device.

Next, the procedure of recording/reproducing will be described.

In the first place, the above-mentioned recording medium 31 comprising $Si_3N_4/SiO_2$/p-Si is fixed on the rotor 202 by the use of an adhesive (an epoxy resin adhesive). This adhesive film itself is extremely thin, but it effectively functions to remove the extremely fine vibration of the ultrasonic motor.

The distance (Z) between the probe 2 and the recording medium 31 is kept to separate them as much as several $\mu$m.

Next, the rotor is rotated. That is, a voltage having a predetermined input frequency is applied to a pair of divided and patterned electrodes by the power source 210 to vibrate a piezo-electric element (PZT), so that the stator generates a progressive wave, whereby the rotor is rotated. The ultrasonic motor can be driven under preferable conditions by suitably selecting the above-mentioned input voltage and input frequency.

Figure 9A:
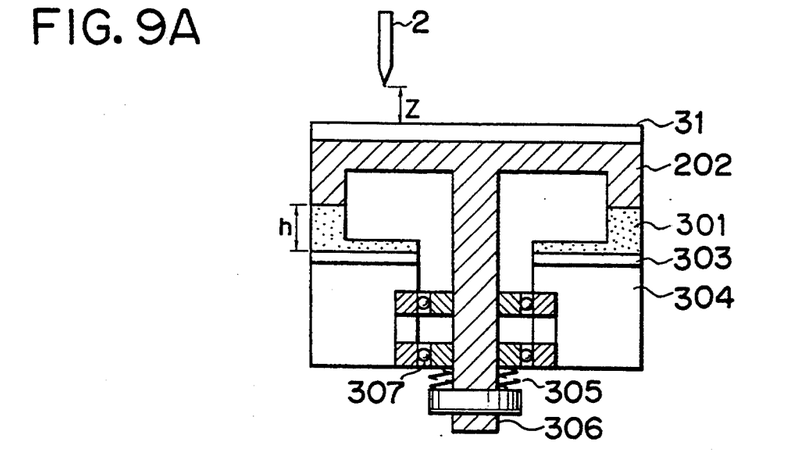
FIGS. 9A to 9C are schematic diagrams illustrating the behavior of the ultrasonic motor in FIG. 8.
Figure 9B:
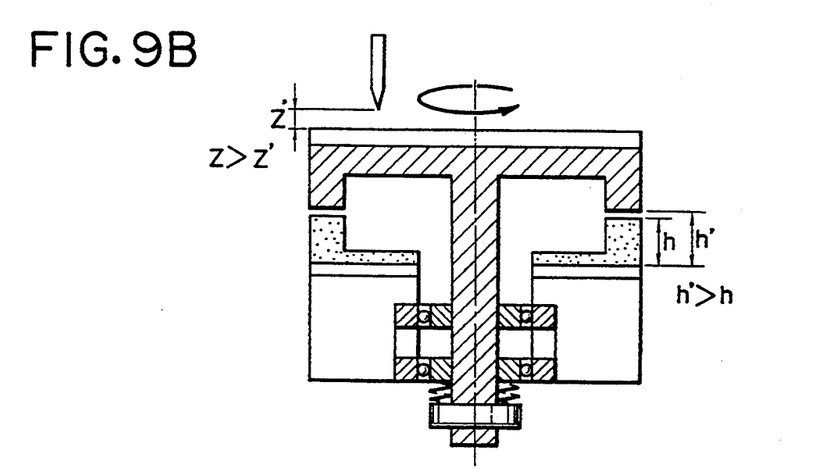
Figure 9C:
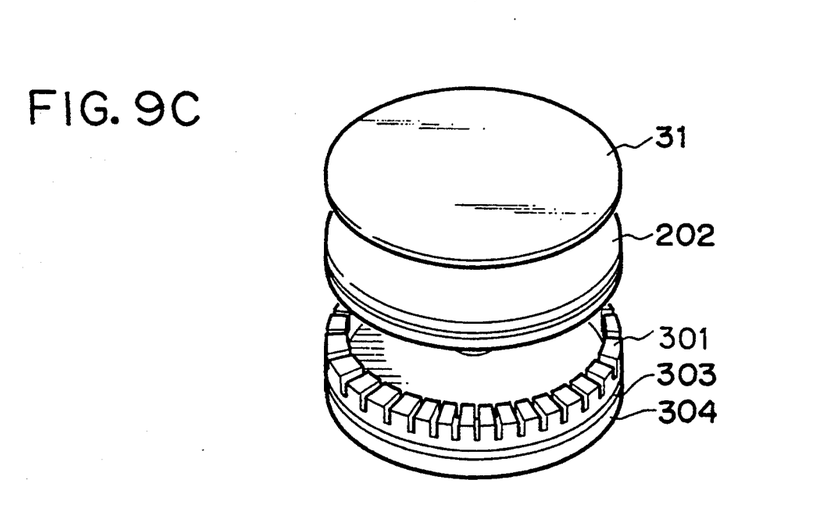

Furthermore, the amplitude of a piezo-electric sheet which vibrates under the conditions of the applied voltage can be regulated by optionally selecting the above-mentioned driving conditions. Referring to FIGS. 9A to 9C, 9A shows a sectional view of the ultrasonic motor at the time of non-driving; 9B shows a sectional view of the ultrasonic motor at the time of driving; and 9C shows an exploded perspective view of the ultrasonic motor. The piezo-electric member periodically vibrates by the application of a voltage. This vibration substantially increases the thickness of the stator from (h) to (h'). At this time, the distance Z between the probe and the recording medium decreases, so that the probe comes up to the recording medium as much as an increment. Thus, the probe approaches to the recording medium under a good control at an interval of a distance (several nm) which permits the recording and reproducing.

According to this constitution, the probe can be kept sufficiently separate from the surface of the recording medium at the time of non-driving. Therefore, even if vibration is given from the outside at the time of non-recording and non-reproducing, the probe can be prevented from coming in contact with the surface of the recording medium, so that the recording medium can be protected from damage and deterioration. In particular, these mechanisms can be received in a cassette (FIG. 6), which is particularly effective for the portable recording medium.

After the probe is brought close to the surface of the recording medium by increasing the substantial thickness of the stator, the recording or reproducing is carried out. The recording or reproducing can be done by the same procedure as described in U.S. Pat. No. 4,575,822. The stop of the device can be carried out by turning off the power source. When the application of the voltage to the piezo-electric element has been shut off, the vibration of the piezo-electric element is immediately stopped, so that the substantial increase in the thickness of the stator is lost, with the result that the rotor automatically returns to the initial position and the probe becomes more distant from the recording medium. As understood from foregoing, the stop of the power supply and the retraction of the recording medium can be simultaneously achieved only by turning the switch off, without requiring any additional operation of separating the probe from the recording medium. This constitution makes the operation easy. It is not necessary to particularly dispose a retracting mechanism. In addition, not only when the power source is actively turned off but also when it is passively done by power failure or the like, the retraction of the recording medium is conveniently carried out, so that the recording medium can be protected from damage.

As described above, the recording medium itself can be scanned along X and Y axes by the multi-probe head of the present invention, and the information processor in which the multi-probe head of the present invention is utilized can be miniaturized and lightened. In addition, according to the present invention, the information processing can be effected at a higher speed and at a higher density.

What is claimed is:

1. An information processing apparatus, comprising:
    a probe for reading information from and writing information onto a medium;
    means for applying a voltage between said probe and the medium; and
    means for generating a progressive wave in a planar direction of the medium to displace the medium relative to said probe.

2. An information processing apparatus, comprising:
    a probe for reading information from and writing information onto a medium;
    means for applying a voltage between said probe and the medium; and
    means, including a piezo-electric film interposed between a plurality of divided electrodes, for generating a progressive wave in a planar direction of the medium to displace the medium relative to said probe.

3. An information processing apparatus, comprising:
    a probe for reading information from and writing information onto a medium; and
    a cantilever provided on a substrate and having a piezo-electric film and electrodes for displacing said piezo-electric film by an inverse piezo-electric effect disposed on said substrate, with said probe disposed on a free end of said cantilever, wherein
    a progressive wave is generated in a planar direction of the medium to displace the medium relative to said probe.

4. The information processing apparatus according to claim 1 or 2, further comprising a cantilever, wherein said probe is provided on a free end of said cantilever.

5. The information processing apparatus according to any of claims 1 to 3, wherein the information processing apparatus is a scanning tunneling microscope.

6. The information processing apparatus according to any of claims 1 to 3, wherein the information processing apparatus is a recording/reproducing apparatus.

7. The information processing apparatus according to claim 1 or 2, wherein said means for generating the progressive wave is an ultrasonic motor.

8. The information processing apparatus according to claim 1 or 2, wherein a plurality of probes are provided.

9. A device for use in an information processing apparatus, comprising:
    a cantilever having a piezo-electric film and electrodes for displacing said piezo-electric film by an inverse piezo-electric effect disposed on a substrate;
    a probe provided on a free end of said cantilever for reading information from and writing information onto a medium, wherein
    a progressive wave is generated in a planar direction of the medium to displace the medium relative to said probe.

10. The device according to claim 9 wherein a plurality of probes are provided.

* * * * *

UNITED STATES PATENT AND TRADEMARK OFFICE
CERTIFICATE OF CORRECTION

PATENT NO. : 5,444,191
DATED : August 22, 1995
INVENTOR(S) : Yamamoto et al.

It is certified that error appears in the above-indentified patent and that said Letters Patent is hereby corrected as shown below: On the title page: Item

[56] REFERENCES CITED:

U.S. PATENT DOCUMENTS, "5,126,618 11/1992 Knowles" should read --5,162,618 11/1992 Knowles--.

[57] ABSTRACT:

Line 8, "31" (both occurrences) should be deleted.

COLUMN 7:

Line 19, "Langmuir-Blodgert" should read --Langmuir-Blodgett--.

COLUMN 10:

Line 62, "claim 9" should read --claim 9,--.

Signed and Sealed this

Thirteenth Day of February, 1996

Attest:

BRUCE LEHMAN

Attesting Officer          Commissioner of Patents and Trademarks